United States Patent [19]
Evans et al.

[11] Patent Number: 4,887,332
[45] Date of Patent: * Dec. 19, 1989

[54] SEMI-AUTOMATIC STUFFING MACHINE, CASING BRAKE AND TURRET ASSEMBLY

[75] Inventors: Alfred J. Evans, Raleigh; R. Clay Dunigan, Benson, both of N.C.

[73] Assignee: Delaware Capital Formation, Inc., Wilmington, Del.

[*] Notice: The portion of the term of this patent subsequent to Jul. 18, 2006 has been disclaimed.

[21] Appl. No.: 263,681

[22] Filed: Oct. 28, 1988

Related U.S. Application Data

[63] Continuation-in-part of Ser. No. 251,667, Sep. 29, 1988.

[51] Int. Cl.$^4$ .............................................. A22C 11/04
[52] U.S. Cl. .......................................... 17/35; 17/38; 17/49
[58] Field of Search ................. 17/35, 33, 38, 49, 1 F, 17/41, 42

[56] References Cited

U.S. PATENT DOCUMENTS

| | | | |
|---|---|---|---|
| 4,417,368 | 11/1983 | Washburn | 17/35 |
| 4,442,568 | 4/1984 | Petry | 17/35 |
| 4,646,386 | 3/1987 | Dreisin | 17/35 |

*Primary Examiner*—Willis Little
*Attorney, Agent, or Firm*—Allegretti & Witcoff, Ltd.

[57] ABSTRACT

An improved stuffing horn and casing brake combination in a stuffing machine comprises a stuffing horn defining a second horn portion with second-horn-portion outer dimensions reduced in comparison to the first-horn-portion dimensions of a first horn portion. A casing brake mechanism intermittently brakes the movement of casing from the stuffing horn past a horn discharge opening by applying tension to the casing on the horn, and has a first brake portion and a second brake portion, where the brake portions have internal dimensions sized relative to the horn-portion dimensions for applying tension to casing on the horn between both brake portions and only the first horn portion, or between only the second brake portion and the first horn portion, when either the second brake portion is, or both portions are, in a braking position relative to the first horn portion. A full braking is applied to the casing by both brake portions and a reduced braking is applied to the casing by only the second brake portion, which provides for full tension and braking during product stuffing and reduced tension and braking during product clipping. A stuffing horn turret assembly includes a turret assembly body, and separate stuffing horn where the turrent assembly body defines a cylindrical central passage and cylindrical branching passages. The central passage defines a central passage centerline, and the branching passages, which are in open communication with the central passage, are each angled at an acute angle relative to the central passage and the central passage centerline. The separate stuffing horns each has a first portion defining a first portion passage substantially parallel to the central passage and a second portion which defines a second passage in open communication with the first portion passage, is angled at the acute angle relative to the central passage, and is in open communication with a branch passage.

3 Claims, 12 Drawing Sheets

SEMI-AUTOMATIC STUFFING MACHINE, CASING BRAKE AND TURRET ASSEMBLY

BACKGROUND OF THE INVENTION

This invention relates to food processing machinery, more particularly packaging machines such as stuffing machines of the type which make sausages and similar stuffed meat and stuffed food products, and most particularly, to a stuffing machine incorporating a stuffing horn turret assembly and casing brake.

Sausage making and the making of similar stuffed meat and food products have become highly automated. As a result of significant, valuable research in the United States, a variety of machines have been successfully developed for the automated and semi-automated production of stuffed sausages, meats, and foods. One such machine is disclosed in U.S. Pat. No. 4,142,273 issued Mar. 6, 1979 to Robert W. Gay and assigned to Rheem Manufacturing Company, New York, N.Y. In a machine such as that disclosed in the identified patent, sausage material is pumped from a vat to a stuffing horn turret assembly. The assembly has multiple stuffing horns, and sequences the horns through servicing, stuffing and sausage end clipping positions. Shirred casing is applied over the end of a stuffing horn in the servicing position, and in the stuffing position of the horn, the casing and material pumped to the horn leave the horn simultaneously, through a casing brake. The stuffing material fills the casing and the casing maintains the material under slight pressure. The casing brake permits the casing to exit under uniform tension. Adjacent the casing brake, a clipping mechanism intermittently acts to void the casing past the brake and clips the stuffed casing, to define the end of an exiting product and the beginning of the next product. A representative, highly desirable clipping mechanism is disclosed in U.S. Pat. No. 4,001,926 issued Jan. 11, 1977 to Clyde R. Velarde and assigned to Rheem Manufacturing Company, New York, N.Y. The exiting product exits onto a discharge tray.

Another notable machine is disclosed in U.S. Pat. No. 4,675,945 issued on June 30, 1987 to Alfred Evans et al. and assigned to Tipper Tie, Inc., Apex, N.C. In the machine of the identified Evans patent, a mechanism is provided for movement of the casing brake, to intermittently relieve tension on the casing during clipping of product. While the machines of U.S. Pat. No. 4,142,273 and U.S. Pat. No. 4,675,945 have proven highly desirable, significant opportunity has existed for improvement.

SUMMARY OF THE INVENTION

In a principal aspect, the present invention comprises an improved stuffing horn and casing brake combination in a stuffing machine. The combination comprises a stuffing horn defining a discharge opening, adapted to receive casing, and having two specialized portions. The specialized portions are a first horn portion and a second horn portion, where the first horn portion has first-horn-portion outer dimensions and the second horn portion has second-horn-portion outer dimensions which are reduced in comparison to the first-horn-portion dimensions. The combination further comprises a casing brake mechanism for intermittently braking the movement of casing from the stuffing horn past the discharge opening by applying tension to the casing on the horn, and also having two specialized portions. The two specialized brake portions are a first brake portion and a second brake portion, where the brake portions have internal dimensions sized relative to the horn-portion dimensions for applying tension to casing on the horn between both brake portions and only the first horn portion, or between only the second brake portion and the first horn portion, when either the second brake portion is, or both portions are, in a braking position relative to the first horn portion.

The stuffing horn and casing brake mechanism are mounted on the machine for movement relative to each other to and from a stuffing position of the casing brake means and the stuffing horn and to and from a clipping position of the casing brake means and the stuffing horn. In the stuffing position, the first brake portion and the second brake portion are both in a braking position relative to the first horn portion and both cooperate with the first horn portion for applying tension to the casing. In the clipping position, the second brake portion remains in a braking position relative to the first horn portion and it, but only it, cooperates with the first horn portion for braking casing.

With this combination, a full braking may be applied to the casing by both brake portions and a reduced braking may be applied to the casing by only the second brake portion, which provides for full tension and braking during product stuffing and reduced tension and braking during product clipping.

In another principal aspect, the invention comprises a stuffing horn turret assembly which includes a turret assembly body, and separate stuffing horns where the turret assembly body defines a cylindrical central passage and cylindrical branching passages. The central passage defines a central passage centerline, and the branching passages, which are in open communication with the central passage, are each angled at an acute angle relative to the central passage and the central passage centerline. The separate stuffing horns each has a first portion defining a first portion passage substantially parallel to the central passage and a second portion which defines a second passage in open communication with the first portion passage, is angled at the acute angle relative to the central passage, and is in open communication with a branch passage. The assembly further comprises collars releasably fastened to the turret assembly body along the branching passages and retaining the stuffing horns to the turret assembly body.

These and other principal aspects the invention are more full appreciated by a reading of the detailed description of the preferred embodiment of the invention, which follows.

BRIEF DESCRIPTION OF THE DRAWING

The accompanying drawing illustrates the preferred embodiment of the invention, and the machine of the drawing is not the only form which the invention as claimed may take. The drawing and the following detailed description of the preferred embodiment are intended to limit the claims only as consistent with the law of claim interpretation, whereby claims are interpreted in light of the specification and drawing.

For orientation of the reader to the drawing, and for ease of beginning of reading of the following description, a brief description of the drawing is as follows.

The description which follows refers to the componentry of the machine in such spatial terms as "upper", "lower" "left", "right", etc. Terms such as these, which depend of the specific spatial orientation of the components are intended for the aid of the reader, and except as incorporated into the claims, not as a limitation on the possible orientation of components in any possible alternate, but covered, embodiment of the invention.

DETAILED DESCRIPTION OF THE PREFERRED EMBODIMENT

U.S. Pat. Nos. 4,001,926; 4,023,238; 4,142,273; 4,675,945 and 4,766,713 are incorporated by reference. A patent application of even date with this application, also filed in the name of Alfred Evans, titled Improved Discharge Tray Mechanism, and having Attorney Case No. 88,697, is also incorporated by reference.

Figure 1:
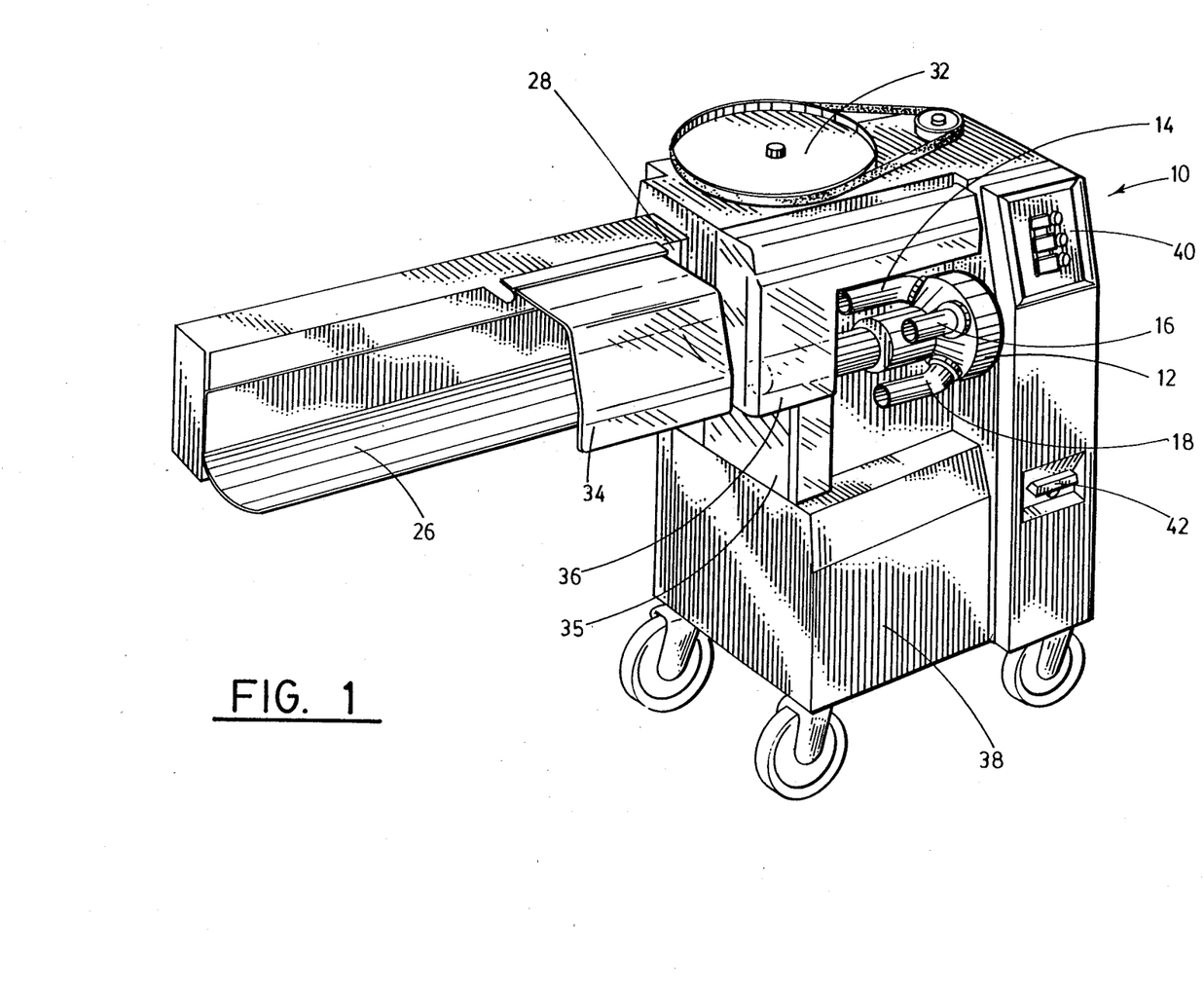
FIG. 1 is an overall perspective view of the preferred embodiment of the invention, which is a sophisticated semi-automated stuffing machine.
Figures 2, 3, 4:
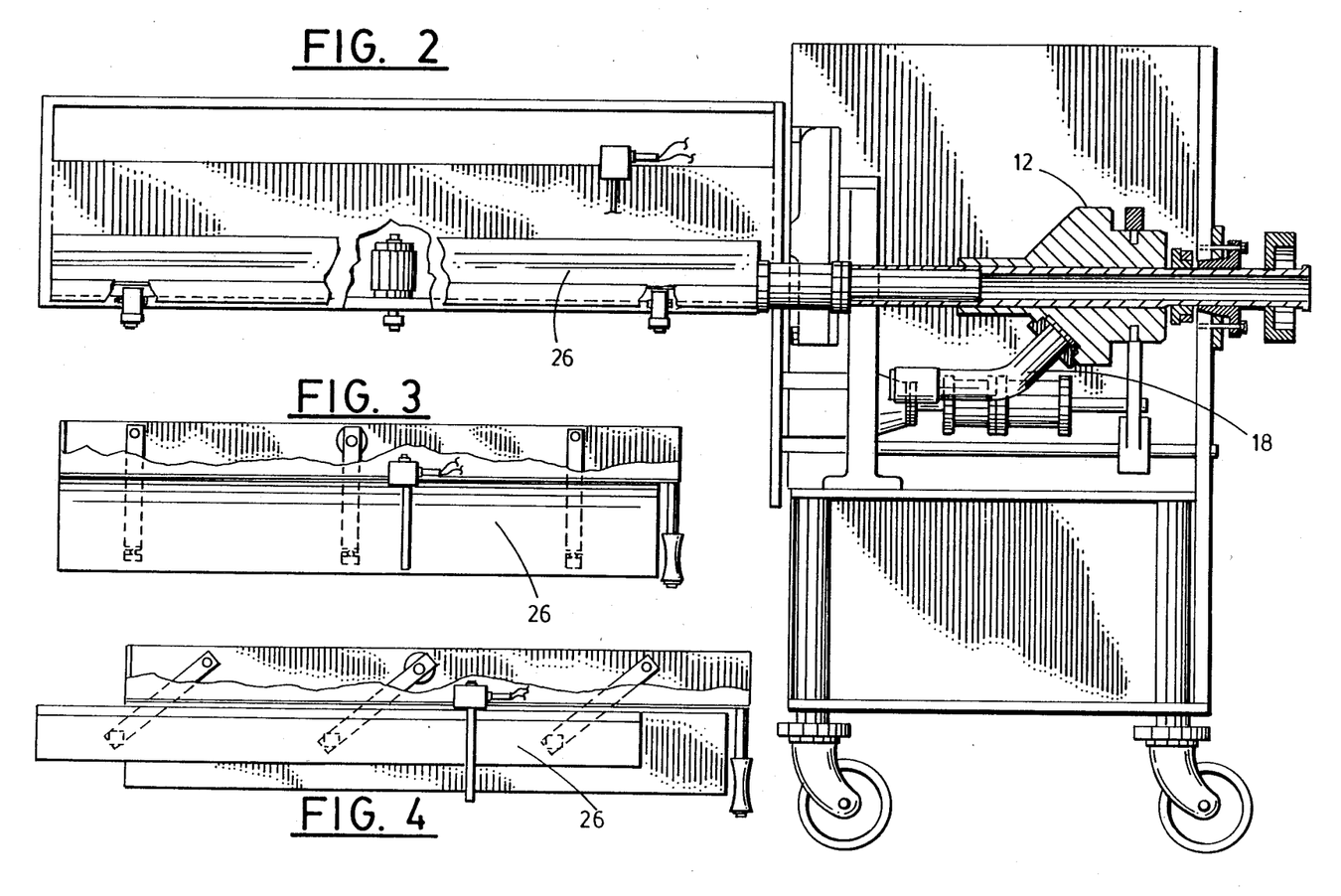
FIG. 2 is a side elevation view of the machine of FIG. 1, with portions sectioned and additional portions broken away to reveal internal detail.
FIG. 3 is a top plan view of a product discharge tray of the machine of FIG. 1, in a product receiving position.
FIG. 4 is a top plan view of the product discharge tray, in a discharging position.
Figure 5:
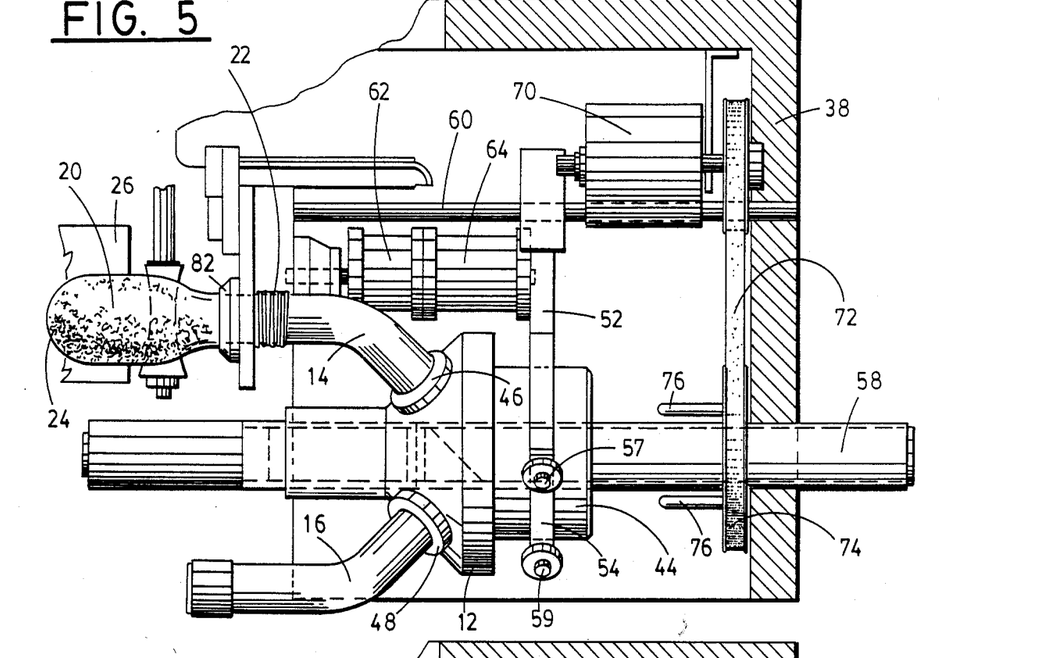
FIG. 5 is a top plan view of a portion of the machine of FIG. 1, sectioned and broken away to reveal internal detail, with the stuffing horn turret assembly and casing brake located to place a stuffing horn and the casing brake in stuffing position.
Figure 6:
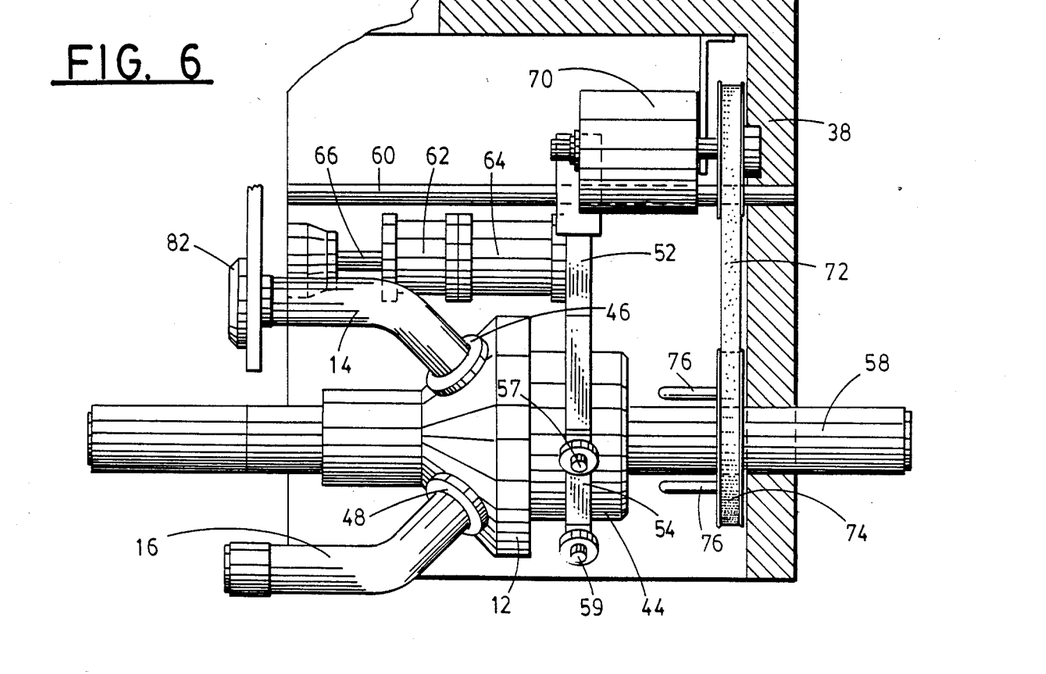
FIG. 6 is a top plan view of the same portion of the machine of FIG. 1 as in FIG. 5, again sectioned and broken away to reveal internal detail, with the stuffing horn turret assembly and casing brake located to place the same stuffing horn and the casing brake in clipping position.

Referring to FIG. 1, the preferred form of the invention is embodied in a stuffing machine generally designated 10 and shown in a static, non-operating condition. The appearance of the machine 10 is ornamental in its streamlining, and may be protected by design patent. The machine 10 includes a stuffing horn turret assembly 12, including multiple stuffing horns 14, 16, 18. Comminuted material to be cased enters the machine from the right in FIG. 1, under pressure of a pump (not shown and not a part of the invention). The material, as shown at 20 in FIG. 5, exits a stuffing horn, as casing 22 stored on the horn also exits, forming a cased product 24 on a product discharge tray 26. In the area designated 28 in FIG. 1, a clipping mechanism, shown diagrammatically at 30 in FIG. 13, intermittently clips voided casing to form ends of discharged products and beginnings of next products. Clips are fed to the clipping mechanism, through the machine, from a pancake tray 32 atop the machine. Hinged translucent guards 34, 35, 36 protect the machine operator and increase sanitation. All the foregoing is mounted atop a base or frame generally 38, atop wheels.

Figure 18:
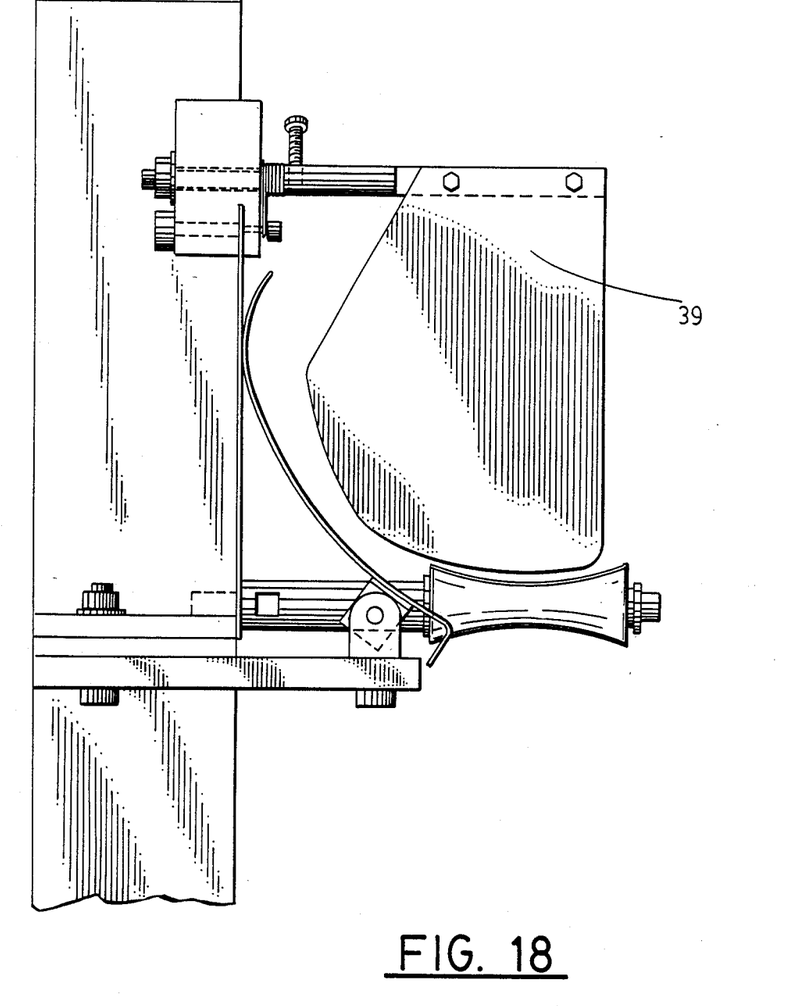
FIG. 18 is a detail, cross-sectional view of the product discharge tray mechanism of the machine, in a product discharging state of operation.

As stated, the machine 10 is semi-automatic. The machine relies upon operator input at control panel 40 to direct turret movement during start up for casing loading and horn filling. Once loading is complete the operator places the controls in an automatic mode and initiates a cycle start function. This action starts the system on an automatic mode in which all movements are controlled automatically by electro/pneumatic control devices. Product size is controlled by either portion control contained within the filler (not shown; not a part of the invention) or length measurements via a trip paddle 39 (FIG. 18). Operator installation of casing on the horns, while in the servicing position, is also required. Activation, and de-activation, is provided by control 42, also through pneumatics.

Referring to FIGS. 5-11, the stuffing horn turret assembly 12 includes a turret assembly body 44. The stuffing horns 14, 16, 18 are components separate from the body 44, held in place by collars 46, 48, 50, as hereinafter described. A yoke 52 includes a ring portion 54 fitted over an exterior groove of the body 44. The body is rotatable relative to the yoke 52. The yoke, also depicted in FIG. 8, extends to a remote portion 56. Intermediate the ring portion and the remote portion, a multiple cylinder drive is attached to the yoke 52.

The turret assembly body 44 is mounted on a manifold tube 58, for movement along the tube. As can be seen by comparing FIGS. 5, 6, and 7, the turret assembly 12 is movable among at least three axial positions. Movement is under the power of the multiple cylinder drive attached to the yoke 52. The turret assembly is also removable, by removal of pins 57, 59.

A yoke guide rod 60 affixed to the frame extends parallel to the manifold tube 58. The remote portion 56 of the yoke 52 is slidable along the guide rod 60. The multiple cylinder drive attached to the yoke 52 includes a first yoke drive cylinder 62, and a second yoke drive cylinder 64. The cylinders 62, 64 and their cylinder rods extend parallel to the manifold tube 58 and the guide rod 60. A first cylinder rod 66 of the first cylinder 62 is affixed at its remote end to the frame. A second cylinder rod 68 is affixed at its remote end to the yoke 52. While the rods 66, 68 are non-extended, i.e., retracted, the yoke 52 and turret assembly 12 occupy forward positions as in FIG. 5. Extension of the first rod 66 from its cylinder 62 drives the yoke 52 and the turret assembly 12 to middle positions as in FIG. 6. Extension of the second rod 68 from its cylinder 64 drives the yoke 52 and the turret assembly 12 to rearward positions as in FIG. 7.

A turret rotary actuator 70 is connected by a drive belt 72 to a sprocket 74. The actuator 70 is mounted to the frame 38. The sprocket 74 is rotatable around the manifold tube 58 rearward of the turret assembly 12. The belt extends transversely to the manifold tube 58, and rotation of the sprocket 74 is about an axis collinear with the centerline of the manifold tube 58.

Figure 10:
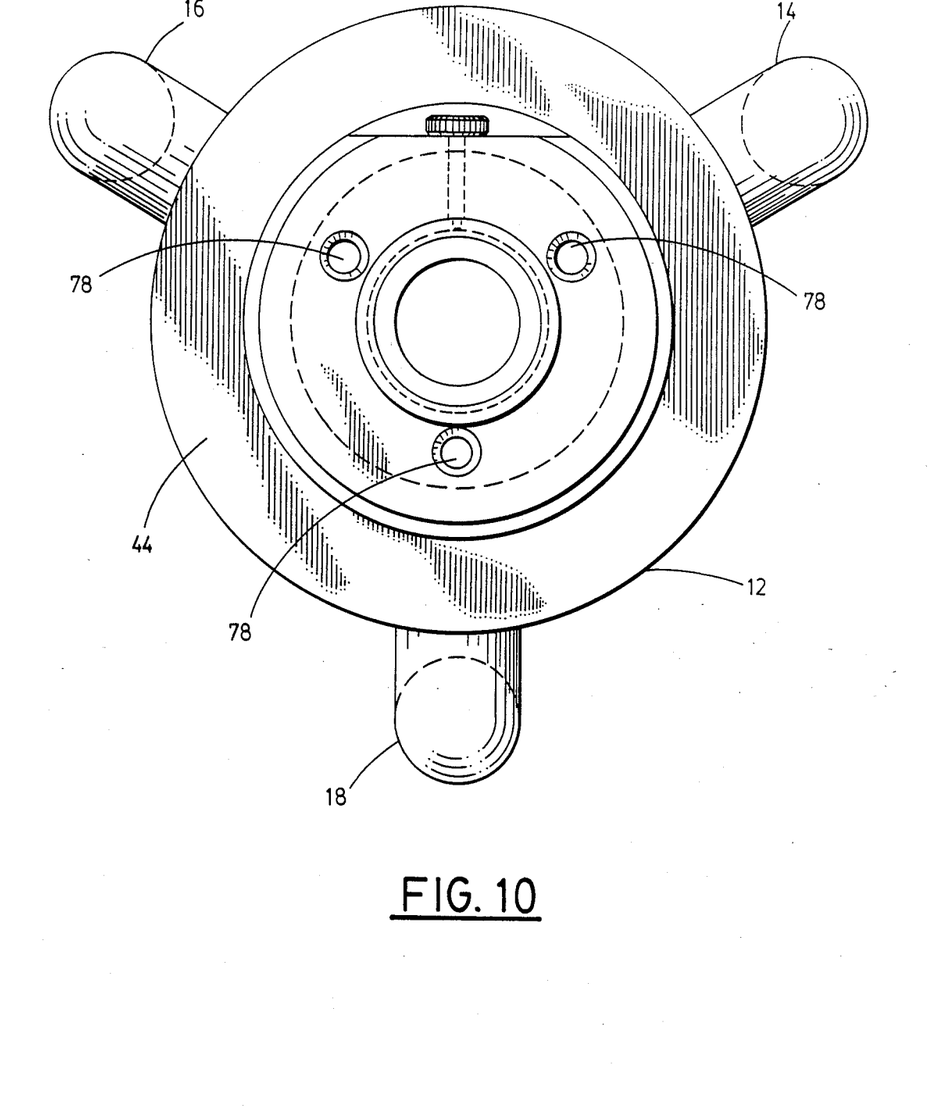
FIG. 10 is a rear end view of the stuffing turret horn assembly.

Pins 76 project forward axially from the sprocket 74. As best seen in FIG. 10, pin openings 78 are defined in the rearward face of the turret assembly body 44. The pins 76 are sized to project into the pin openings 78, when the pin openings 78 are brought into proximity with the pins 76.

Figure 7:
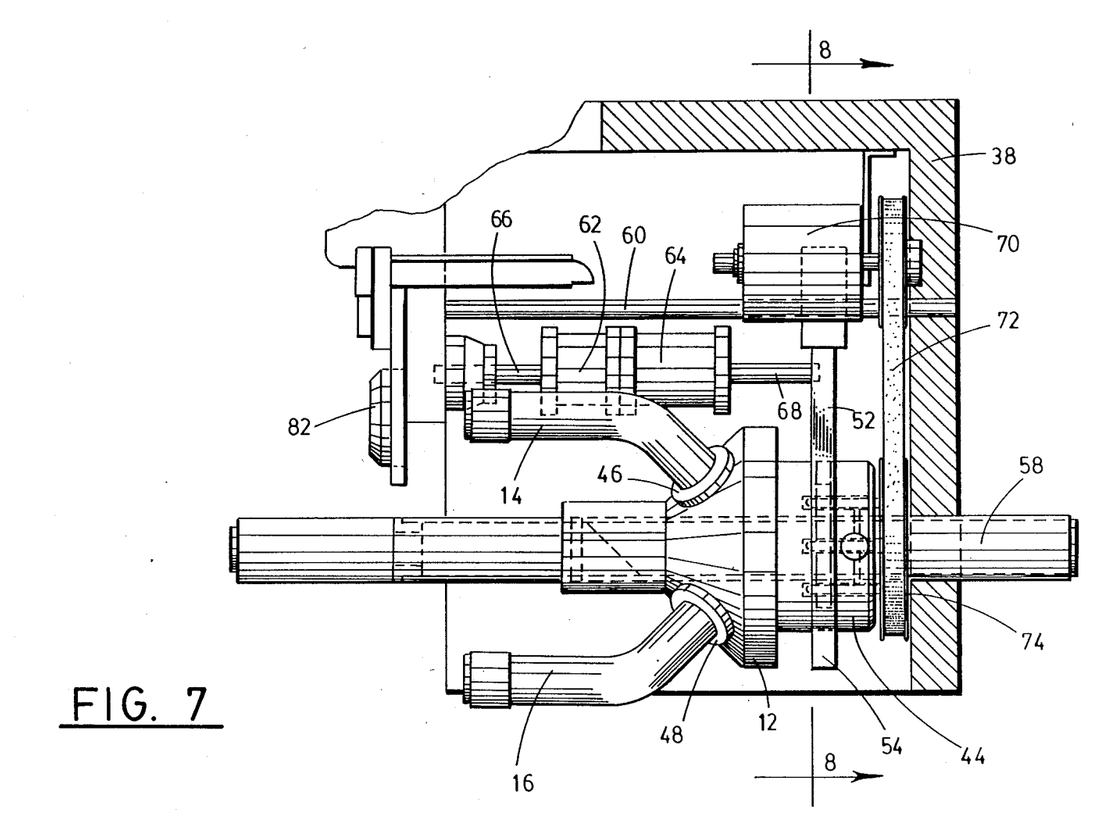
FIG. 7 is a top plan view of the same portion of the machine of FIG. 1 as in FIG. 5 and FIG. 6, again sectioned and broken away to reveal internal detail, with the stuffing horn turret assembly and casing brake located to place the stuffing horns in servicing position.
Figure 8:
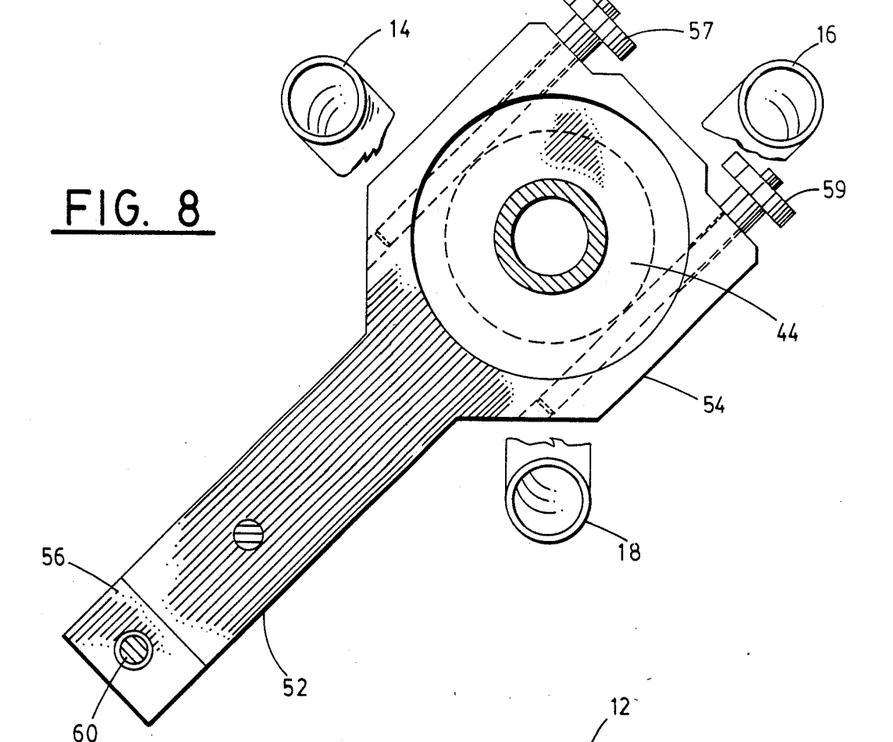
FIG. 8 is a partial cross-sectional view of the machine of FIG. 1, taken along line 8—8 of FIG. 7, and depicting a yoke which drives the stuffing horn turret assembly in axial movement.

Referring to FIG. 7, in the rearward positions of the yoke 52 and the turret assembly 12, the pins 76 project into the pin openings 78. The turret assembly 12 comes under the rotational control of the sprocket 74, and via the belt 72, of the turret rotary actuator 70. Thus, the rotational positions of the horns 14, 16, 18 are determined by the actuator 70. The horns 14, 16, 18 are spaced at equal angles radially, and the actuator 70 is adapted to index the horns 14, 16, 18 through an arc equal to the spacing between two horns.

In the rearward position of the yoke 52 and turret assembly 12, the horns 14, 16, 18 are, by definition, in a servicing position. As shown in FIGS. 1 and 7, the horn can be reached by an operator for placement of casing on the horns, or otherwise as needed. In the forward position of the horns, as with horn 14 in FIG. 5, one of the horns, the horn farthest the operator and control panel 40, is brought into a stuffing position relative to a casing brake mechanism 82. In the middle position of the horns, as in FIGS. 6-18, the same horn as was in the stuffing position is placed in a clipping position, to be described.

Figure 11:
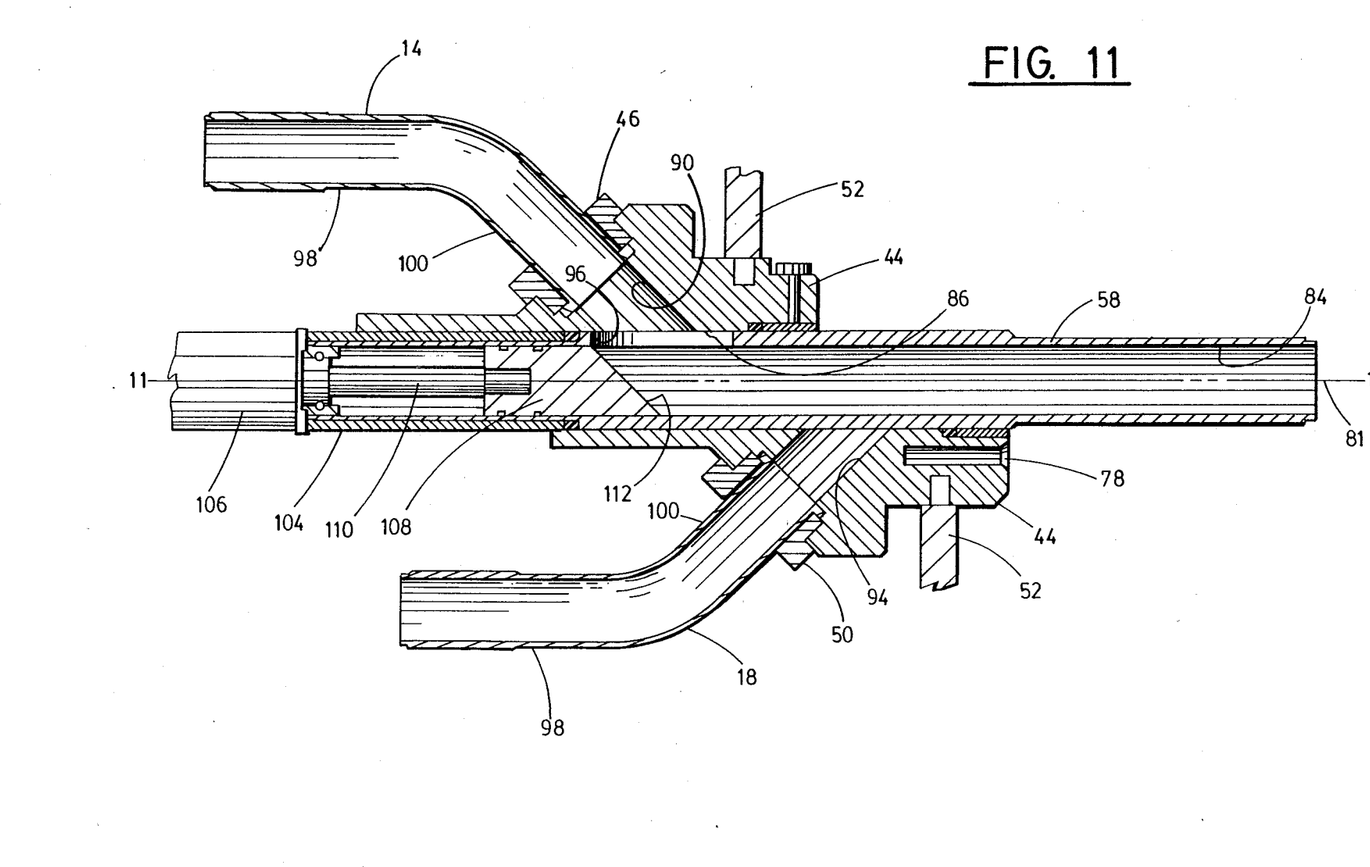
FIG. 11 is a split cross-sectional view of the stuffing horn turret assembly, depicting the assembly in the servicing position of the horns below centerline 11—11 and depicting the assembly in the stuffing position of a horn above the centerline 11—11.
Figure 12:
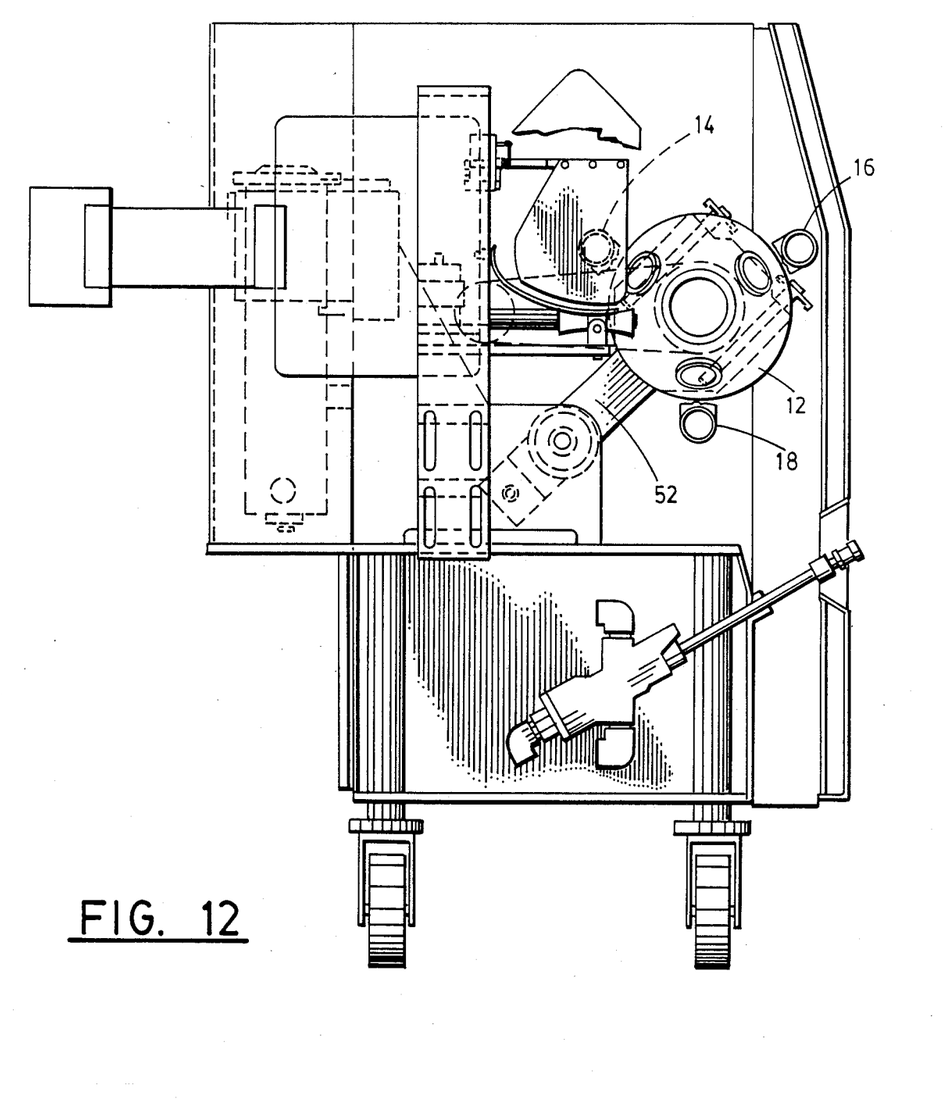
FIG. 12 is an end elevation view of the machine.

Referring to FIG. 11, the manifold tube 58 defines an internal, cylindrical manifold passage 84. The turret assembly body 44, formed of Delrin$^{tm}$, defines a cylindrical central passage 86, which has a centerline 81 (also line 11-11 in FIG. 11). The manifold tube 58 is fitted through the central passage 86, and the manifold passage 84 is collinear with the centerline 81. The turret assembly body 44 also defines multiple branch tubes such as 90, 94 for each horn 14, 16, 18. The branch tubes such as 90, 94 each extend at an acute angle, specifically at approximately 45°, from the central passage 86. A radial opening 96 in the manifold tube 58 provides communication between the manifold passage 84 and a single branch tube of the turret assembly body 44. The radial opening is located to provide communication to the branch tube to which a horn is in communication when the horn is in the stuffing position.

Figure 9:
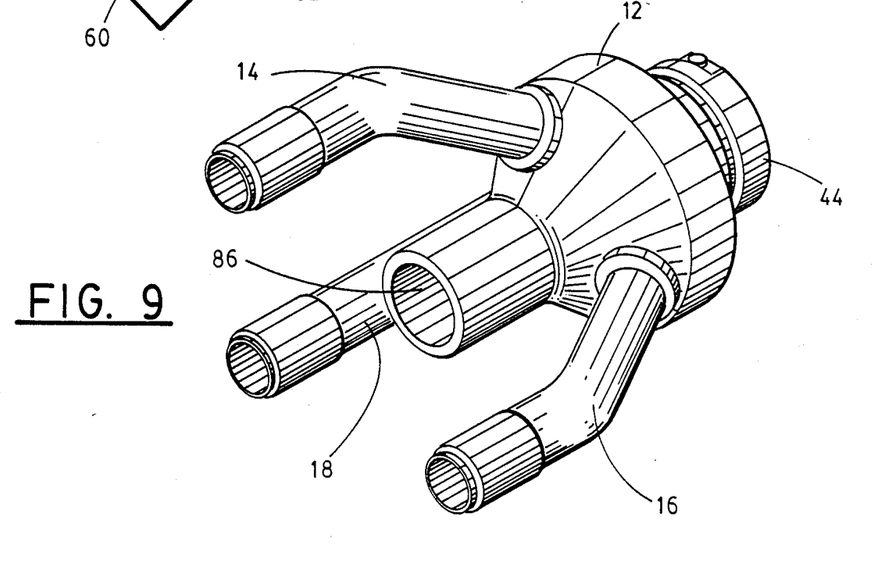
FIG. 9 is a perspective view of the stuffing horn turret assembly.

Each stainless steel stuffing horn 14, 16, 18 is in open communication with a branch tube such as 90, 94. As shown in FIGS. 9 and 11, each collar 46, 48, 50, formed of stainless steel, is releasably fastened by screw threads into the turret assembly body 44 about a stuffing horn 14, 16, 18 at the external opening of a branch tube such as 90, 94. The collar retains an annular flange of the horn against the body, and thereby retains the horn to the body.

A first portion 98 of each stuffing horn, as shown in FIG. 11, extends parallel to the manifold tube 58 and defines a passage parallel to the central passage 86 and manifold passage 84. A second portion 100 of each horn continues from the first portion 98, and extends at the same acute angle relative to the centerline 81 as the branch tubes extend.

Forward of the stuffing horns 14, 16, 18, the manifold tube 58 has a reduced outer diameter. A sleeve 104 is fitted on the reduced diameter portion, and a piston pump 106 is attached to the sleeve 104. The piston pump 106 drives a piston 108 within the manifold tube 58. The piston 108 and piston pump 106 are collinear with the manifold tube 58. Extension of the rod 110 of the piston pump 106 drives the piston 108 toward the radial opening 96 in the manifold tube 58, causing operation in the manner of U.S. Pat. No. 4,023,238. A face 112 of the piston 108 is inclined at the same acute angle as the branch tube with which the radial opening 96 communicates, for smoothly directing material from the manifold passage 84 through the radial opening and into the branch tube.

Figure 14:
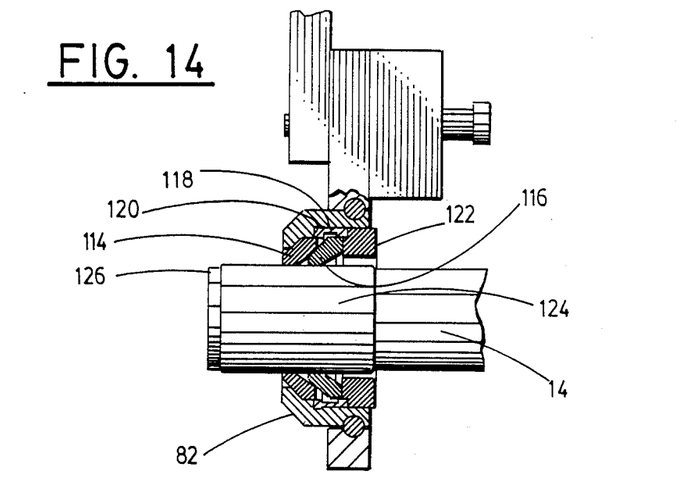
FIG. 14 is a detail, cross-sectional view of the casing brake and a stuffing horn of the machine in a stuffing position.
Figure 15:
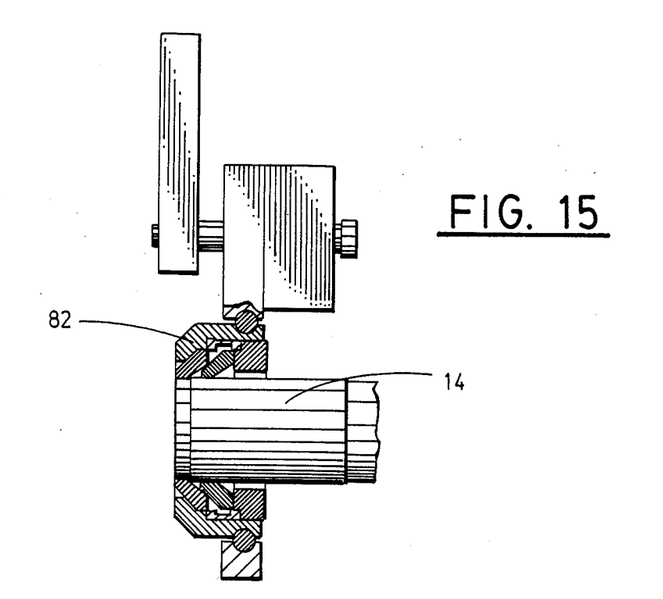
FIG. 15 is a detail, cross-sectional view of the casing brake and a stuffing horn of the machine in a clipping position.
Figure 16:
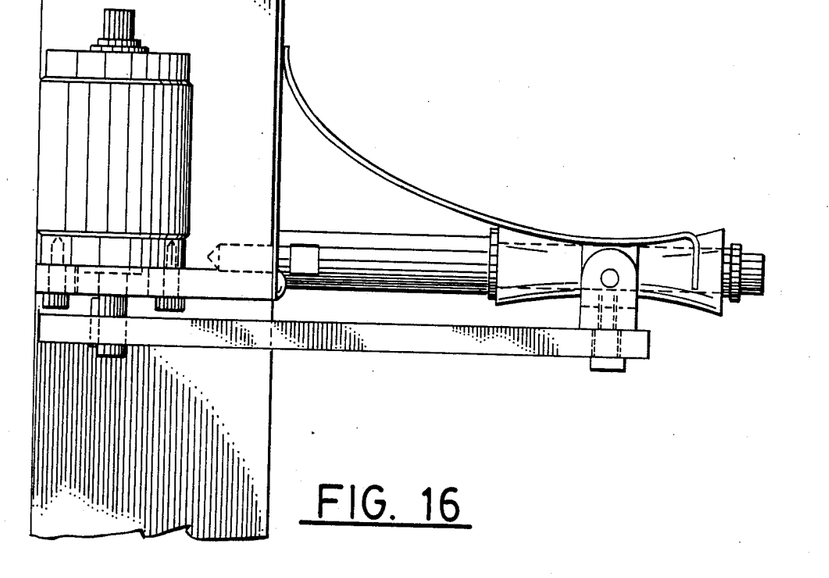
FIG. 16 is a detail, end elevation view of the product discharge tray mechanism of the machine, in a product receiving state of operation, as in FIG. 5.
Figure 17:
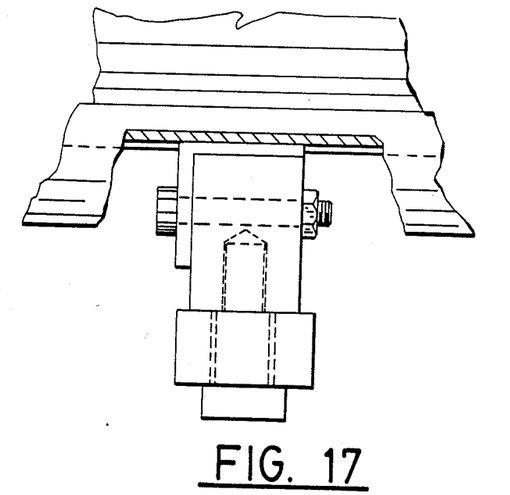
FIG. 17 is a detail view of a mounting of the product discharge tray.

A mechanism as in U.S. Pat. No. 4,675,945 (FIGS. 10 and 11 thereof) reciprocates the casing brake mechanism 82 forward and rearward a short distance. The drive cylinder 62 also moves each stuffing horn, sequentially, to and from the stuffing and clipping positions. Referring to FIGS. 14 and 15, movement of the casing brake mechanism 82 and horns is co-ordinated. While a horn is in the stuffing position, the casing brake mechanism is also in a forward, stuffing position. While the horn is in the clipping position, the casing brake mechanism is also in a rearward, clipping position. The horn moves farther to the clipping position than the casing brake mechanism moves to the clipping position, and as a result, the horn is farther removed from the casing brake mechanism in the clipping position, as in FIG. 15, than in the stuffing position, as in FIG. 14.

The casing brake mechanism 82 includes two annular casing brakes 114, 116. The two casing brakes 114, 116 define two portions of the casing brake mechanism. A first of the casing brakes, brake 114, is forward of the second brake, brake 116. As most preferred, the brakes 114, 116 are identical. A first annular fitting 118 slip fits to an outer frame 120 and is used to space casing brakes 114, 116. A second annular fitting 122 screw fastens to the outer frame 120 and retains components 114, 116, 118 within 120. Adjusting annular fitting 122 applies a compressive force to the rear face of casing brake 116 which in turn applies a force to annular fitting 118 which in turn applies a compressive force to the rear face of annular fitting 114. This action adjustably tighten the brakes 114, 116 which will vary the tensions of the casing on the horn. As with a conventional singular casing brake, each casing brakes 114, 116 tensions the casing shirred on a horn as it exits the horn through the brake. In the case of the two brakes 114, 116, each brake contributes to the required tension while the brake mechanism 82 is in the stuffing position.

In contrast, in the clipping position of the brake mechanism 82, only the second brake 116 provides tension to the shirred casing. The first portion 98 of each stuffing horn includes two segments, a first segment 124, and a second segment 126. The second segment 126 has outer dimensions defined by an outer diameter which are reduced in comparison to the outer dimensions defined by the outer diameter of the first segment 124. The first segment protrudes into the casing brake mechanism into operative association with both the first casing brake and the second casing brake when the casing brake mechanism and stuffing horn are in the stuffing position. The first segment protrudes into the casing brake mechanism into operative association with the second casing brake only when the mechanism and horn are in the clipping position. The second, reduced diameter segment protrudes into the first casing brake when the mechanism and horn are in the clipping position, but does not cooperate with the second brake to provide braking. Protrusion of the second segment in the clipping position assures ready return to the stuffing position by continued guidance of shirred casing past the first brake.

As a result of the configuration of the horn segments and brakes, a full braking is applied to the shirred casing for stuffing, and a partial braking is applied for clipping.

Figure 13:
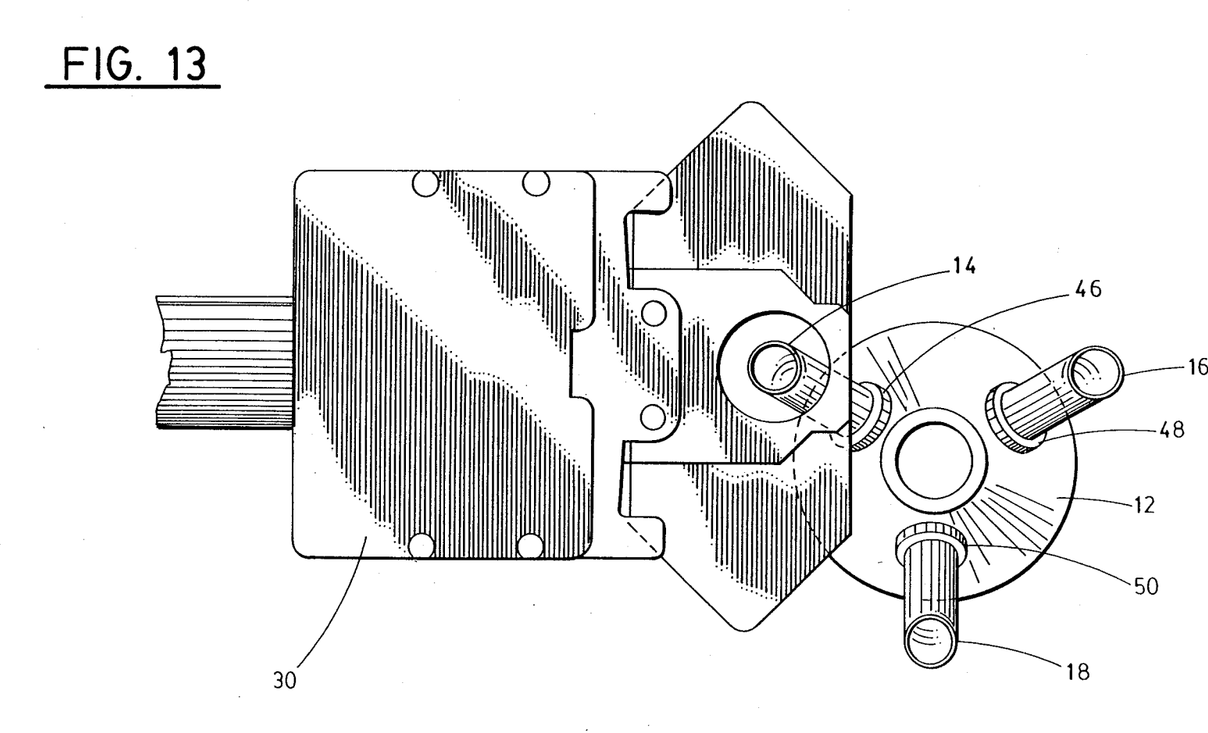
FIG. 13 is a diagrammatic view of the clipping mechanism and turret assembly of the machine.

As stated above, and shown in the incorporated patents, the clipping mechanism includes a punch which drives clips around voided casing against a die to form ends of discharged products and beginnings of next products. The clipping mechanism 30 includes pairs of voider plates (not shown) which define a throat through which the casing passes. The throat has an axial extent parallel to the axial extent of turret assembly 12 and a transverse extent perpendicular thereto. The voider plates narrow the throat about the casing transversely, to gather the casing tightly. Clips are placed transversely.

In a common stuffing machine, a clipping mechanism is located adjacent a casing brake, opposite a stuffing horn. Whatever the movement of the casing brake and horn, the casing brake and horn do not move in the path of the clipping mechanism. In the most preferred embodiment of the subject invention, and in the stuffing position of the brake mechanism 82 and a stuffing horn, both the brake mechanism 82 and stuffing horn are in the path of the clipping mechanism 30. By definition, they are "in" the clipper, i.e., in the "clipping zone". Movement from the stuffing position to the clipping position removes the casing brake mechanism 82 and stuffing horn from the clipper and its path.

Also in the most preferred embodiment, movement from the stuffing position to the clipping position, and retraction of the piston pump 106, provide substantially all voiding of the casing, in contrast to voiding being substantially completely accomplished by the voiding plates of the clipping mechanism. Such voiding occurs as pumping of comminuted material is discontinued during movement of the horn and brake mechanism 82 to the clipping position. The piston pump 106 is also retracted, further diminishing pressure on the comminuted material at the opening of the horn.

The movement to the clipping position causes shirred casing to pass through the brake mechanism 82 and extend forward of the horn. Because pumping of comminuted material from the supply is discontinued and the piston pump 106 is retracted, the casing passes through the brake mechanism substantially empty. To any extent comminuted material remains under pressure at the opening of the horn despite release of pressure at the base of the pertinent branch tube behind the horn, and to any extent comminuted material continues to flow from the horn, the second casing brake 116 provides the important function of preventing backflow to the outside of the stuffing horn in the area of the shirred casing. The casing brake 116 continues a contact with the stuffing horn, confining backflow such that it occurs forward of the casing brake mechanism 82, only.

The preferred embodiment of the invention is now described in detail. This detailed description is such that a person of ordinary skill in the art of the invention could make and use the invention, and the preferred embodiment is the best mode contemplated by the inventor. Nevertheless, an invention exists as part idea, part hardware. The detailed description of the preferred embodiment is not to be confused with, or taken as, an effort to claim the invention, for the invention is broader than the hardware described. To particularly point out and distinctly claim the subject matter regarded as invention, the following claims conclude this specification.

What is claimed is:

1. In a stuffing machine a stuffing horn and casing brake combination comprising: a stuffing horn defining a discharge opening, adapted to receive casing, and having a first horn segment and a second horn segment, the first horn segment having first-horn-segment outer dimensions and the second horn segment having second-horn-segment outer dimensions which are reduced in comparison to the first-horn-segment dimensions:

casing brake means for intermittently braking the movement of casing from the stuffing horn past the discharge opening by applying tension to the casing on the horn, having a first brake portion and a second brake portion, the first brake portion and the second brake portion having internal dimensions sized relative to the first-horn-segment outer dimensions and the second-horn-segment outer dimensions for applying tension to casing on the horn between the second brake portion and only the first horn segment, between the second brake portion and only the first horn segment, or between both the first and second brake portions and only the first horn segment, when either the first brake portion or the second brake portion is, or both portions are, in a braking position relative to the first horn segment;

the stuffing horn and casing brake means being mounted on the machine for movement relative to each other to and from a stuffing position of the casing brake means and the stuffing horn wherein the first brake portion and the second brake portions are both in a braking relative to the first horn segment and both cooperate with the first horn segment for applying tension to the casing, and to and from another position of the casing brake means and the stuffing horn wherein only the second brake portion is in a braking position relative to the first horn segment and only the second brake portion cooperates with the first horn segment for braking casing;

whereby a full braking may be applied to the casing by both brake portions and a reduced braking may be applied to the casing by only the second brake portion, which provides for full braking during product stuffing and reduced tension during product clipping;

the stuffing horn defining a discharge direction of product discharge, in which the first horn segment is more distant from the discharge opening than the second horn segment, in the direction opposite the discharge direction, and of a first outer diameter, and the second horn segment is adjacent the discharge opening and of a second outer diameter smaller than the first outer diameter;

the stuffing horn and casing brake means being mounted on the machine for movement from the braking position to the another position by movement of the stuffing horn a distance in the discharge direction greater than any movement of the casing brake means;

the stuffing horn and casing brake means being mounted on the machine for movement of both the stuffing horn and the casing brake means from the braking position in a distance opposite the discharge direction, the movement from the braking position to the another position being accomplished by movement of the stuffing horn a distance greater than movement of the casing brake means;

whereby the casing brake means is movable from its braking position to provide a partially voided area within the casing within the clipping zone and to provide clearance;

the casing brake means in the braking position being located in the clipping zone.

2. A stuffing horn and casing brake combination as in claim 1 in which the stuffing horn in the braking position is located in the clipping zone.

3. A stuffing horn and casing brake combination as in claim 2 in which the movement from the braking position moves the casing brake means and the stuffing horn out of the clipping zone, the movement accomplishing substantial voiding within the casing to produce a substantially voided casing tail.

* * * * *